United States Patent

Oblizajek et al.

(10) Patent No.: US 6,714,858 B2
(45) Date of Patent: Mar. 30, 2004

(54) ON ROAD CORNER DYNAMIC BALANCING FOR VEHICLE WHEELS

(75) Inventors: Kenneth L. Oblizajek, Troy, MI (US); Carl T. Wright, Highland, MI (US); John D Sopoci, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/208,667

(22) Filed: Jul. 30, 2002

(65) Prior Publication Data

US 2004/0024520 A1 Feb. 5, 2004

(51) Int. Cl.$^7$ ................................. G01M 1/16
(52) U.S. Cl. ..................... 701/124; 73/460; 73/462; 73/146.2
(58) Field of Search .................... 701/124, 111; 73/460, 462, 570, 146.2, 146.4, 146.5, 146.8; 340/442

(56) References Cited

U.S. PATENT DOCUMENTS

| | | | |
|---|---|---|---|
| 5,792,948 A | * 8/1998 | Aoki et al. ............... | 73/116 |
| 6,263,738 B1 | * 7/2001 | Hogle ...................... | 73/593 |
| 6,412,886 B1 | * 7/2002 | Abe et al. ................. | 303/139 |
| 6,450,020 B1 | * 9/2002 | Naito et al. .............. | 73/146.2 |
| 2002/0124650 A1 | * 9/2002 | Matsumoto .............. | 73/460 |

OTHER PUBLICATIONS

Random Data: Analysis and Measurement Procedures, Second Edition, Julius S. Bendat and Allan G. Piersol, John Wiley & Sons Publication, ISBN 0–471–04000–2, 1986, Chapter 6 Single–Input/Output Relationships pp 164–200, Chapter 7 Multiple–Input/Output Relationships pp 201–251.

Continuous and Discrete Signal and System Analysis, Third Edition, Clare D. McGillem and George R. Cooper, Saunders College Publishing, Holt Rinehart and Winston Inc., Lib of Congress Catalog No 90–053273, Chapter 4 Fourier Analysis of Discrete Signals pp 177–217.

Shock and Vibration Handbook, Third Edition, Cyril M. Harris, McGraw–Hill Book Company, ISBN 0–07–026801–0, 1988, Chapter 39 Balancing of Rotating Machinery, pp 39–1 to 39–32.

Dynamics of Physical Systems, Robert H. Cannon Jr., McGraw–Hill Book Company, Lib of Congress Catalog No 65–2521, 1967, Chapter 7 Section 7.2 Complex Numbers, Section 7.3 Mathematical operations with Complex Numbers, Section 7.4 Complex–Vector (Phasor) representation of a Sine Wave, pp 236–243.

Mechanics Applied to Vibrations and Balancing, $2^{nd}$ Edition, D. Laugharne Thornton, Chapman and Hall Ltd., London, 1939, pp 1–12.

* cited by examiner

*Primary Examiner*—Marthe Y. Marc-Coleman
(74) *Attorney, Agent, or Firm*—Laura C. Hargitt

(57) ABSTRACT

An on-road balancing system is provided that includes an analyzer, vibration sensor, and rotation sensor. The rotation sensor is coupled to at least one vehicle wheel and the vibration sensor is coupled to a component within the vehicle. The analyzer is responsive to input from the rotation sensor and the vibration sensor to calculate a phasor quantity representative of vibrations transmitted from the wheel to the component.

19 Claims, 4 Drawing Sheets

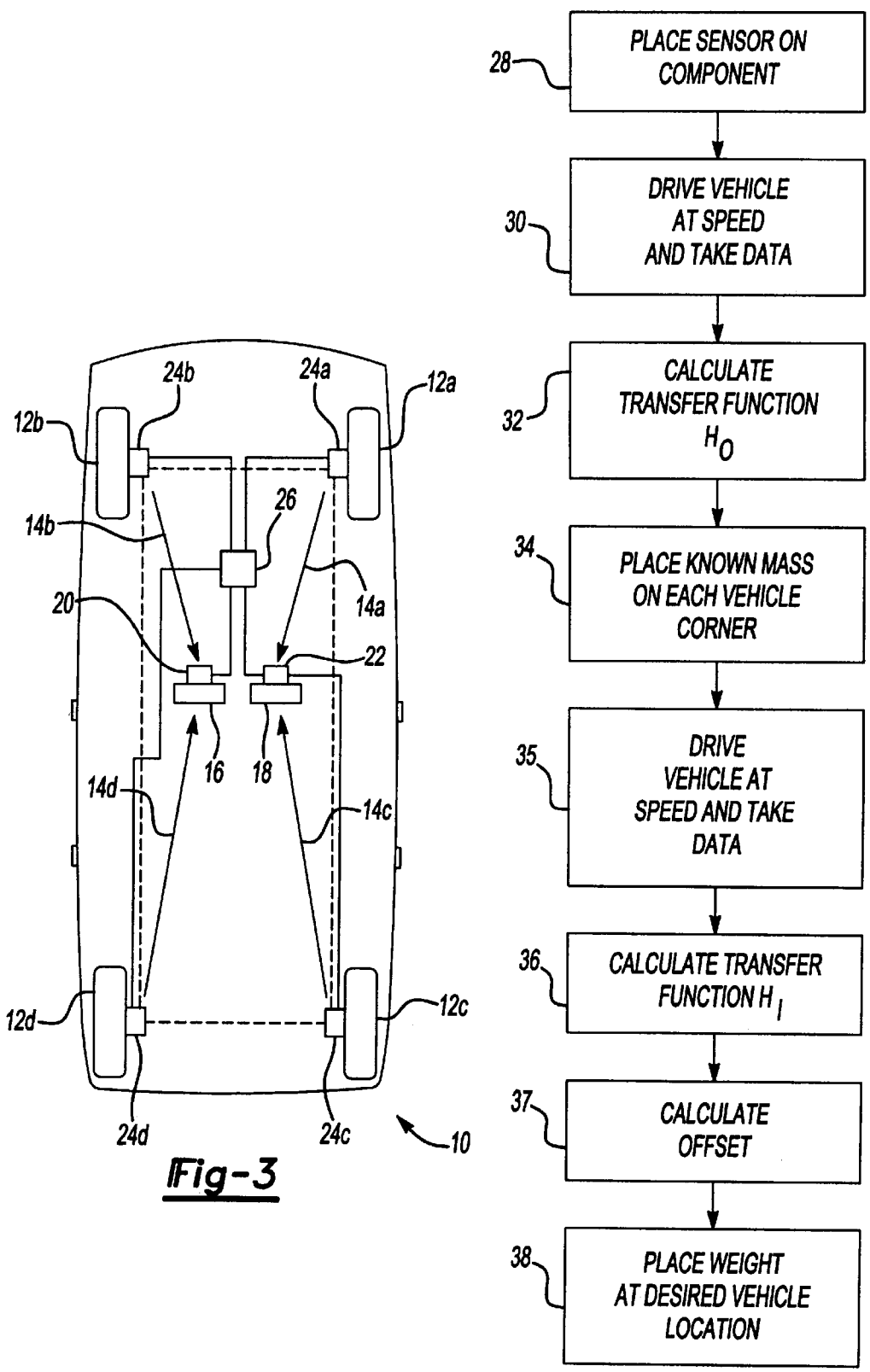

ON ROAD CORNER DYNAMIC BALANCING FOR VEHICLE WHEELS

FIELD OF THE INVENTION

The present invention relates to on-road corner dynamic balancing, and more particularly, the present invention relates to on-road corner dynamic balancing of vehicle wheels to reduce periodic vibrations occurring on a moving vehicle.

BACKGROUND OF THE INVENTION

Vibrations are a common problem in conventional motor vehicles. The causes of these vibrations are numerous. Unwanted vibrations can arise from external excitations, such as those experienced while travelling over irregular road surfaces. Vibrations also arise from internal excitations, such as those caused by irregularities of internal moving parts, including the engine and wheels. These latter vibrations are periodic since their pattern recurs for every rotation of the respective component. The periodic vibrations exist due to the fact that it is impossible to manufacture perfectly uniform moving parts. For instance, during tire manufacturing verifications in tire thickness around the tire circumference can create thicker and thinner regions. This irregular thickness variation can result in a condition commonly known as runout observable through changes in the outside radius of the tire around the circumference. It can also manifest itself in localized weight variation as the mass is unevenly distributed around the tire circumference. This most commonly requires a conventional balance correction.

Another cause of vibration results from the tire bead being improperly manufactured or applied to the tire rim. Not only can this shift the tire mass distribution around the rim, but this can also yield a variation in runout thereby resulting in vibration.

A further source of vibration results from incorrect piloting or inherent piloting errors. Piloting is the means for achieving concentric registration of parts on a common rotary shaft. Its purpose is to perfectly align the centers of rotary parts with that of the shaft. Various implementations of piloting means are possible and indeed used for attaching vehicle wheels to the vehicle hubs, and they vary from product to product. Although the intention of the piloting means is perfect registration of the rotary parts, piloting on vehicles is inherently inaccurate, since the wheel is commonly positioned over the hub in a slip fit fashion. Lug bolts typically pass from the hub, through apertures in the wheel, to secure the wheel to the hub. The slip fit between the hub and the wheel, at interfaces that are designed to align the respective parts, allows the wheel to move radially with respect to the hub, resulting in an eccentric condition of attachment. This allows the wheel to radially shift and produces uneven runout and mass distributions from the center of rotation.

Many other causes of vehicle vibration exist. The above description is merely an overview. However, many of these vibration sources generate first order vibrations throughout the vehicle. First order vibrations are those that exist at frequencies identical to the rotational frequencies of the many shafts. Depending on the speed at which the vehicle is traveling and thus at what rotational speeds the wheels are turning, first order vibrations are transmitted throughout the vehicle at frequencies corresponding to the rotational speeds of the wheels. For instance, if the vehicle wheel is rotating at two complete revolutions per second, the frequency at which the first order vibration occurs throughout the vehicle is 2 hertz. Moreover, as vehicles usually contain a number of wheels, each tire excites its respective first order vibration through the vehicle, thereby resulting in a number of first order vibrations in the vehicle.

The vehicle wheels also generate other order vibrations, known as multi-order vibrations. However, these multi-order vibrations, occurring at frequencies corresponding to integer multiples of the rotational frequency in excess of unity, are typically less pronounced than those at first order frequencies. This situation is more clearly illustrated in FIG. 1. Here, the frequency order is listed on the X-Axis while its intensity is listed on the Y-axis. As shown, a first order frequency commonly has a large amplitude as compared with second, third, and fourth order frequencies, which diminish with respect to the order number. As can be seen, frequencies occurring at or near the first order frequencies typically account for the predominant vibrations occurring in a vehicle.

The vibrations excited by the vehicle wheels, whether first order or multi-order vibrations, are transmitted throughout the vehicle. These transmitted vibrations, in turn, result in portions of the vehicle, including portions located near the vehicle driver to occasionally vibrate excessively. When a system's natural frequency, as shown in FIG. 2, overlaps with a frequency of an excitation the system oscillates at an exceptionally large amplitude. The vehicle is such a dynamic system and responds to the excitation at the wheels in this manner. At certain frequencies, therefore, the resulting vehicle vibrations can be readily noticed by a vehicle occupant. As the first order frequency generates the largest vibrations, it is usually the source of noticeable vibrations.

Manufacturers and service departments routinely attempt to reduce first order vibrations to eliminate these noticeable vibrations. Conventionally, the wheels and tires are "balanced" as assemblies on shop floor machines to reduce contributions to the first order excitation. Alternatively, the vehicle is lifted from the floor of the service garage, and the wheels are "balanced" while still affixed to the vehicle in order to reduce first order vibrations. This latter method is commonly referred to as "On-Car Balancing" and employs special measurement transducers and analyzers. It also requires two measurement steps at each corner of the vehicle. During the initial measurement step of this method, a wheel is rotated independent of the remaining wheels to generate a first measurement indicative of the first order vibration on that particular wheel. A weight of known magnitude is then applied to a known location on the wheel and a second measurement is obtained. By using these two separate measurements, a weight and location can be determined which, when applied to the wheel, will offset and reduce the first order vibration. This procedure is repeated for each wheel independently to reduce the first order vibrations generated by the vehicle wheels. These balancing methods are well known to those skilled in the art and are common practice at many service facilities.

Although these balancing methods can reduce vibration when the vehicle is lifted off of the ground, they do not entirely eliminate vibrations occurring during on-road performance. Actual driving conditions present additional first order vibrations or change existing first order vibrations. One of the most significant sources of these additional vibrations is that of the loaded, rolling tire. The loaded, rolling operation of a tire introduces excitation and response dynamics that are relatively large and not accounted for in either of the balancing methods described previously. Accordingly, the first order vibrations generated with the vehicle in motion are significantly different than the first order vibrations generated by the independent wheel off the ground. Therefore these vibrations are not compensated for by conventional off-ground balancing techniques.

SUMMARY OF THE INVENTION

The present invention provides an on-road balancing system that is responsive to rotational input from a vehicle wheel and vibration sensed on any part of a vehicle to reduce or eliminate vibrations occurring on that part.

In a first aspect of the invention, an on-road balancing system is provided that includes an analyzer, vibration sensor, and rotation sensor. The rotation sensor is coupled to at least one vehicle wheel and the vibration sensor is coupled to a part within the vehicle. The analyzer is responsive to input from the rotation sensor and the vibration sensor to calculate a measurement representative of vibrations transmitted from the wheel to the part. In another aspect, a vehicle is provided having the on-road balancing system as described above.

In a further aspect of the present invention, four rotation sensors are coupled to four respective wheels of the vehicle. The analyzer is responsive to input from each of the four rotation sensors and the vibration sensor to calculate a measurement representative of each wheel's vibration contribution.

In another aspect, a method for conducting on-road balancing of vehicle wheels is provided. Here, a vibration sensor is placed on a part of the vehicle and a rotational sensor is coupled to a vehicle wheel. Base vibration and rotational data are recorded from the sensors. With this information, a base measurement is calculated. Known weight is placed on the vehicle wheel, and a second set of vibration and rotational data is then taken. An offset is then calculated with the base measurement and the second set of data. An offset weight and location can then be calculated therefrom.

The invention will now be disclosed in details with particular reference to the attached drawings, illustrating a non-limiting embodiment thereof.

BRIEF DESCRIPTION OF THE DRAWINGS

The present invention will now be described, by way of example, with reference to the accompanying drawings, in which:

FIG. 3 is a schematic view of a vehicle using an on-road dynamic balancing system according to the present invention;

FIG. 4 is a flow chart depicting the operation of an on-road dynamic balancing system according to the present invention;

DETAILED DESCRIPTION OF THE INVENTION

Figure 1:
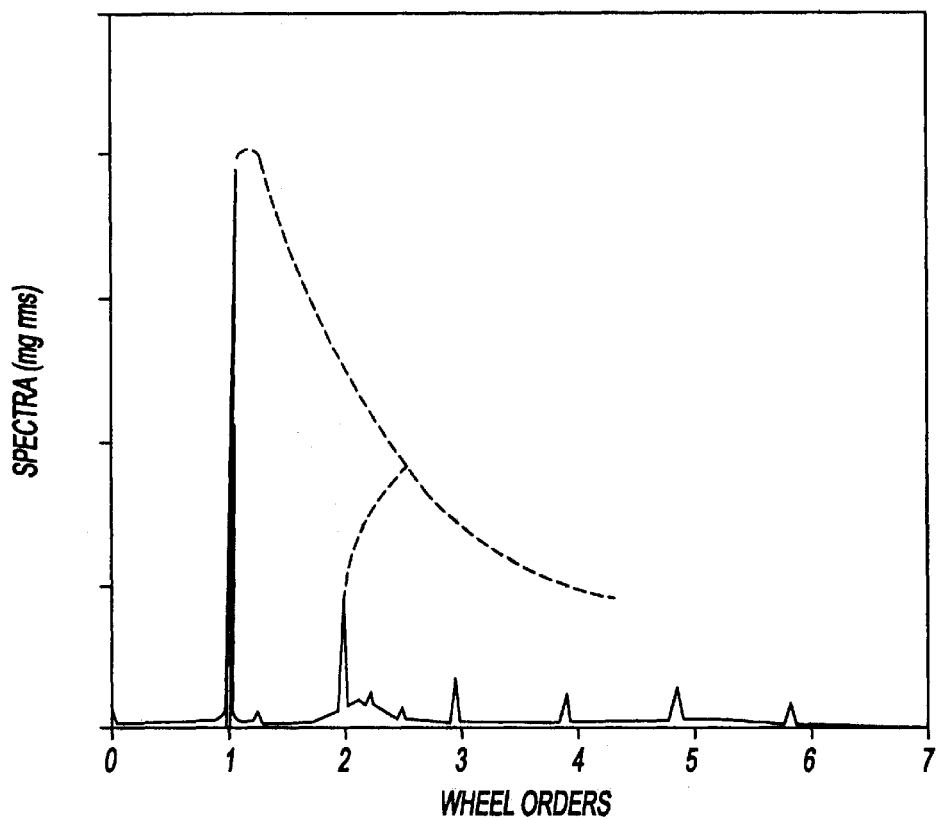
FIG. 1 is a graphical view depicting vibrations at various wheel orders transmitted through a vehicle according to the present invention.
Figure 2:
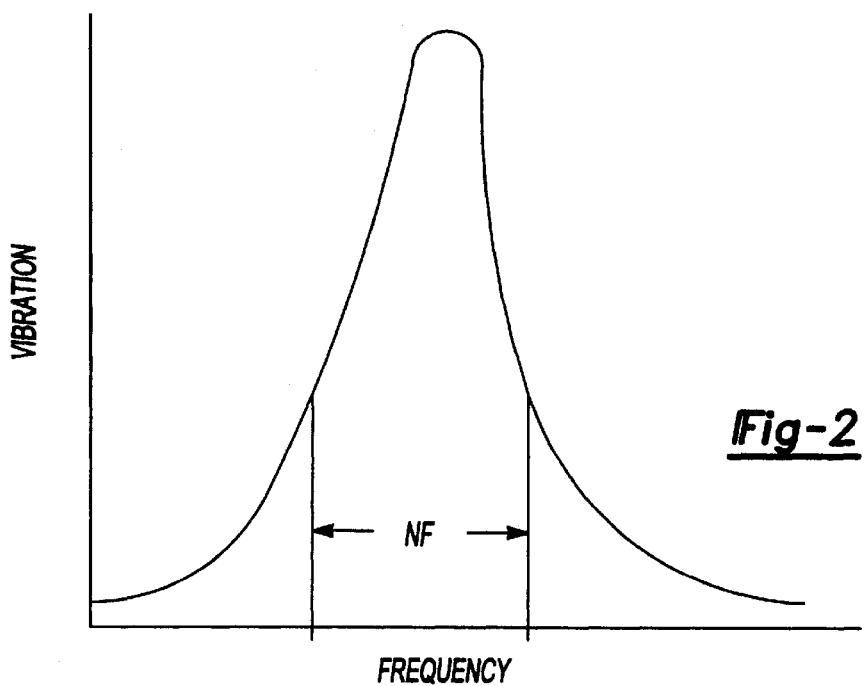
FIG. 2 is a graphical view of a typical dynamic response at a common measurement site of a vehicle demonstrating dynamic amplification when operated near a natural frequency according to the present invention.

Referring now to FIG. 3, the present invention is shown and described. In FIG. 3, vehicle 10 is shown having wheels 12A, 12B, 12C and 12D. Each wheel generates vibrations 14A, 14B, 14C and 14D, which are transmitted to vehicle sites at components 16A and 16B. The vibrations 14A, 14B, 14C and 14D are first order components of vibratory energy from the wheels 12. However, it is understood that vibrations 14 can also be multi-order vibrations; and the present invention can also be used to solve for multi-order vibration as will be described in greater detail.

Components 16 and 18 can be any component within the vehicle, including the vehicle steering wheel, floor, seat, dashboard or other similar component. Components 16 and 18 can also include those parts in proximity of the tires and wheels, including suspension parts such as control arms, struts, knuckles, tie rods or similar components. Components 16 and 18 can also include any intermediate parts between the tires and the occupants, such as cradles, body structure, sheet metal or other convenient parts. Vibration sensors 20 and 22 are attached to components 16 and 18 respectively to sense vibrations occurring thereon. Vibration sensors 20 and 22 sense the instantaneous amplitude of vibrations occurring in each respective component 16 and 18. Counters 24A, 24B, 24C and 24D cooperate with respective wheels 12A, 12B, 12C and 12D by counting when each wheel rotates through a 360-degree revolution. Such counters may include light gates, magnetically coupled sensors, or other similar and known devices. Analyzer 26 communicates with vibration sensors 20 and 22, and the counters 24 to receive vibration and counter information therefrom.

In operation, a predetermined speed is identified which causes the component 16 to vibrate noticeably. For simplicity, only component 16 is discussed now. Then, two separate measurements are generated to model two separate vibration situations. These measurements are generated as the vehicle is driven along a road during normal driving conditions at a predetermined speed. The first measurement or base measurement is representative of the vibrations occurring at component 16 excited by the vehicle wheels. The second measurement is representative of the vibration induced at component 16 when known weights are added to known locations of each vehicle wheel. The measurements are then used to simultaneously solve equations by mathematical procedures to identify the location and weight amount required to offset the vibrations from each vehicle wheel.

The objective of each of the two step measurement operations is to capture vibrations that are attributable to each wheel individually. This is required for both the first and the second measurement steps. Successfully accounting for the individual vibrations from the wheels allows the subsequent calculation of offset balance weights to reduce base vibrations attributable to the individual wheels. Since all wheels are commonly rotating at approximately the same frequency, the measurements must include sufficient samples so as to separate the sources of the vibrations. There are a few different approaches that could be applied to this situation, yielding similar results. The preferred approach involves: (1) transformation of the sampled time histories into the frequency domain, (2) identification of the frequency content that is at the first order of the wheel rotation rate, (3) sampling of sufficient time data that captures the wheels in states of relative angular positions, using criteria for reliable mathematical treatment, and (4) solving the set of simultaneous equations using a model for the aggregated vibration resulting from the concurrent sources at the multiple wheels. The preferred approach likewise uses a linear model for the aggregated vibration, relying on linear superposition of sources at a given measurement site.

Those skilled in the art will recognize alternative methods of solution, such as time-base averaging using the counters as time references. Also possible is the application of extremely long time records, relying on the small, non-zero differences in rotation rates of the individual wheels. Separation of sources with this latter method can be accomplished in the frequency domain by accepted methods known to those skilled in the art. Both of these mentioned alternatives have shortcomings for practical implementations and are not employed in the preferred method.

To obtain the base measurement, analyzer 26 records the time histories of the various site accelerometers and the pulse trains generated by each of the counters 24. Preferably, each record is taken over a four-second interval at a sampling rate of 256 samples per second to form a total of 1,024 samples per accelerometer and counter. However, it is understood that other methods for acquiring data can be used. Each record preferably has a 50% overlap, such that the first record is taken from 0 to 4 seconds, the second record from 2 to 6 seconds, the third from 4 to 8 seconds, and the remainder are taken accordingly. All data are transormed into the frequency domain and phasor quantities of first order content are extracted for all counters and accelerometers. The phasor quantities of counter data are organized into the input matrix of equation 1.

$$\text{Input Matrix } x = \begin{bmatrix} X_{11} & X_{12} & \cdots & X_{1p} \\ X_{21} & X_{22} & \cdots & X_{sp} \\ \vdots & \vdots & \ddots & \vdots \\ X_{n1} & X_{n2} & \cdots & X_{np} \end{bmatrix} \quad \text{Eq. 1.}$$

The Input Matrix in Eq. 1 is intended to provide the phase information from phasor quantities of the counter data. The magnitudes of the input phasors are arbitrary. To facilitate the calculations, the input phasor quantities are normalized to a unity magnitude, i.e., for each column, k, in Equation 1 the following is true $$\frac{2 \text{ Lines}}{n} \sum_{i=1}^{n} |X_{ik}^* X_{ik}| = 1 \quad \text{Eq. 1a}$$

Where Lines is the number of frequency lines combined to represent the target frequency and the factor of 2 used to account for the practice of using only the first half of the Fourier transformation. In equation 1, $X_{11}, \ldots X_{1P}$, the first row of the matrix x, represents the initial time sampled record of the four wheels of the vehicle with P=4. The first column, $X_{11} \ldots X_{n1}$ indicates the recorded count records with each X representing an individual four-second count record of the first wheel position. The remaining rows are the respective time sampled records and the columns are the respective wheel positions throughout the matrix. The analyzer 26 records the count records in the time domain and then converts them into the frequency domain corresponding to the rotation of the wheels 12. Accordingly, each entry of the input matrix of Eq. 1 is in the format of $Ae^{i\emptyset}$ as a phasor quantity that represents the rotation of each vehicle wheel 12. Here, e is the exponential number, i is an imaginary number (sqrt(−1)) and ø is the angular position with respect to the wheel rotation. As is known in the art, such an equation can be used to model periodic motion. The data are gathered at the identified speed that causes component 16 to vibrate noticeably.

Simultaneous to the information gathering described above, vibration information is gathered from vibration sensor 20 with respect to component 16. This information is likewise transformed to the frequency domain to obtain specific samples at and around the first order vibration.

The analyzer, like that for the rotational information, generates data points of $Y_1 \ldots Y_n$ in equation 2. Like the values of equation 1, the data of $Y_1 \ldots Y_n$ are transformed into the frequency domain, and transformed into phasor quantities, $Ae^{i\emptyset}$. Here, in addition to that described previously, A represents the amplitude value, and $\phi$ the phase of the resulting vibration at component 16.

$$\text{Response Matrix } y = \begin{bmatrix} Y_1 \\ Y_2 \\ \vdots \\ Y_n \end{bmatrix} \quad \text{Eq. 2.}$$

The rows of the Response Matrix represent the individual time records corresponding to the rows of the matrix x. Once these equations are developed, $S_{XX}$ and $S_{XY}$ are calculated according to equations 3 and 4. Equations 3 and 4 are then used in Equation 5 to output the resulting values H representing each first order vibration from each vehicle wheel. The values H are likewise phasor quantities consisting of both amplitude and phase information.

$$Sxx = \begin{bmatrix} \sum_{k=1}^{n} X_{k1}^* X_{k1} & \sum_{k=1}^{n} X_{k1}^* X_{k2} & \cdots & \sum_{k=1}^{n} X_{k1}^* X_{kp} \\ \sum_{k=1}^{n} X_{k2}^* X_{k'1} & \sum_{k=1}^{n} X_{k2}^* X_{k2} & \cdots & \sum_{k=1}^{n} X_{k2}^* X_{kp} \\ \vdots & \vdots & \ddots & \vdots \\ \sum_{k=1}^{n} X_{kp}^* X_{k1} & \sum_{k=1}^{n} X_{kp}^* X_{k2} & \cdots & \sum_{k=1}^{n} X_{kp}^* X_{kp} \end{bmatrix} \quad \text{Eq. 3}$$

The symbol (*) represents complex conjugate operation $$Sxy = \begin{bmatrix} \sum_{k=1}^{n} X_{k1}^* Y_k \\ \sum_{k=1}^{n} X_{k2}^* Y_k \\ \vdots \\ \sum_{k=1}^{n} X_{kp}^* Y_k \end{bmatrix} \quad \text{Eq. 4}$$

$$H = Sxx^{-1} Sxy = \begin{bmatrix} H_A \\ H_B \\ H_C \\ H_D \end{bmatrix} \quad \text{Eq. 5}$$

Phasor H has four components $H_A$, $H_B$, $H_C$, and $H_D$, which describes the vibration transmitted from each wheel 12A, 12B, 12C and 12D. Each value of H is in the format of $Ae^{i\emptyset}$ to describe the amplitude (A) and phase information ($\phi$) of the respective contribution of each wheel 12.

To increase the accuracy of the generated phasors, vehicle 10 is driven long enough to allow each respective wheel 12 to offset in relative angular position from the remaining wheels when obtaining the data for Eq. 1. The acquired samples of vibrations and counters need not be continuous and may be interrupted owing to the necessity of allowing for on road conditions that inadvertently develop. Such conditions include local and immediate traffic obstructions or changes in road surfaces that are judged to be unrepresentative of the disturbance. The requirement involves acquisition of data at multiple states of relative orientations of the wheels of the vehicle. It is this offset that allows the components of the phasors H to be distinguished among all four wheels to form $H_A$, $H_B$, $H_C$, and $H_D$. Given a long enough running time, the wheels rotate with respect to each other by vehicle turns and other similar actions. Those skilled in the art recognize this requirement as demanding sufficient orthogonality between the input excitation phasors of the matrix x. Accordingly, by taking more data points to generate the data of equation 1, a more accurate relationship is ultimately output in equation 5. The adequacy of the orthogonality requirement is evidenced in the magnitude of the off-diagonal terms of Eq 1 relative to those of the diagonal terms. Furthermore, a metric of this condition is the coherence matrix of x, defined as follows:

$$\text{Coherence} = \begin{bmatrix} \dfrac{\sum_{k=1}^{n} |X_{k1}^* X_{k1}|^2}{\sum_{k=1}^{n} X_{k1}^* X_{k1} \sum_{k=1}^{n} X_{k1}^* X_{k1}} & \dfrac{\sum_{k=1}^{n} |X_{k1}^* X_{k2}|^2}{\sum_{k=1}^{n} X_{k1}^* X_{k1} \sum_{k=1}^{n} X_{k2}^* X_{k2}} & \cdots & \dfrac{\sum_{k=1}^{n} |X_{k1}^* X_{kp}|^2}{\sum_{k=1}^{n} X_{k1}^* X_{k1} \sum_{k=1}^{n} X_{kp}^* X_{kp}} \\ \dfrac{\sum_{k=1}^{n} |X_{k2}^* X_{k1}|^2}{\sum_{k=1}^{n} X_{k2}^* X_{k2} \sum_{k=1}^{n} X_{k1}^* X_{k1}} & \dfrac{\sum_{k=1}^{n} |X_{k2}^* X_{k2}|^2}{\sum_{k=1}^{n} X_{k2}^* X_{k2} \sum_{k=1}^{n} X_{k2}^* X_{k2}} & \cdots & \dfrac{\sum_{k=1}^{n} |X_{k2}^* X_{kp}|^2}{\sum_{k=1}^{n} X_{k2}^* X_{k2} \sum_{k=1}^{n} X_{kp}^* X_{kp}} \\ \vdots & \vdots & \ddots & \vdots \\ \dfrac{\sum_{k=1}^{n} |X_{kp}^* X_{k1}|^2}{\sum_{k=1}^{n} X_{kp}^* X_{kp} \sum_{k=1}^{n} X_{k1}^* X_{k1}} & \dfrac{\sum_{k=1}^{n} |X_{kp}^* X_{k2}|^2}{\sum_{k=1}^{n} X_{kp}^* X_{kp} \sum_{k=1}^{n} X_{k2}^* X_{k2}} & \cdots & \dfrac{\sum_{k=1}^{n} |X_{kp}^* X_{kp}|^2}{\sum_{k=1}^{n} X_{kp}^* X_{kp} \sum_{k=1}^{n} X_{kp}^* X_{kp}} \end{bmatrix} \quad \text{Eq. 6}$$

The diagonal terms of Equation 6 are clearly unity while the off-diagonal terms of this matrix should approach zero as the number of samples increase.

The ultimate accuracy of the ability to represent the response vibrations as the linear sum of the contributions of the wheel sources can be verified using equations 3, 4 and 5. Equation 8 uses the results of Eq. 3, 4 and 5 to calculate a coherence factor $\gamma^2$ of the linear model being applied. Of course, if only one vehicle wheel is analyzed, then sensor data need only be received from one vehicle wheel 12, thereby eliminating the need to distinguish between the other wheels 12. Those skilled in the art will recognize that this calculation is only valid and legitimately represents contributions from the single wheel only under special conditions. Examples of these special conditions include disproportionately large vibratory contributions from that particular wheel or independent knowledge of the relative incoherent relationship between that wheel position and all others.

$$Syy = \begin{bmatrix} \sum_{k=1}^{n} Y_{k,1}^\circ Y_{k,1} & \sum_{k=1}^{n} Y_{k,1}^\circ Y_{k,2} & \cdots & \sum_{k=1}^{n} Y_{k,1}^\circ Y_{k,p} \\ \sum_{k=1}^{n} Y_{k,2}^\circ Y_{k,1} & \sum_{k=1}^{n} Y_{k,2}^\circ Y_{k,2} & \cdots & \sum_{k=1}^{n} Y_{k,2}^\circ Y_{k,p} \\ \vdots & \vdots & \ddots & \vdots \\ \sum_{k=1}^{n} Y_{k,p}^\circ Y_{k,1} & \sum_{k=1}^{n} Y_{k,p}^\circ Y_{k,2} & \cdots & \sum_{k=1}^{n} Y_{k,p}^\circ Y_{k,p} \end{bmatrix} \quad \text{Eq. 7}$$

$$\gamma^2 = \frac{H \, Sxy}{Syy} \quad \text{Eq. 8}$$

Values above 0.8 are generally considered acceptable, although values above 0.9 are preferred. Values below 0.1 are indicative of a nonfunctioning data channel in receiving the data from the rotation sensors or the response sensor. However, it is understood to one skilled in the art that these values may be modified and the present invention is not limited to that disclosed hearing.

After the base phasors are calculated, known weights are added to known locations on each vehicle wheel 12. This known location is represented by X, which is the change in weight and location from the base phasor measurements. The above described procedure is then repeated to calculate a a second set of phasor quantities that models the vibrations from each of the vehicle wheels 12 in conjunction with the known weights and locations. The result is a new matrix of phasors, $H_1$. $H_0$ is then used in conjunction with the other two elements, as shown in Equation 9, to yield the requisite weight and location to offset the first order vibrations in component 16.

$$X_{1J} = \frac{\Delta X \, H_0}{H_1 - H_0} \quad \text{Eq. 9}$$

It is noted that only one vehicle wheel may be used. In such a case, data are only read from one rotation sensor 14. The above procedure is repeated and the second phasor matrix is solved for only the one wheel 12.

Referring now to FIG. 4, a flow chart is provided depicting the above-described steps required to balance each of the wheels 12. In step 28, sensors 20 are placed on component 16 and counters 24 are placed on wheels 12. In step 30, the vehicle 10 is driven at a specific speed that causes component 16 to vibrate at a desired frequency such as at a speed that produces noticeable disturbances. Vibration sensors 20 and counters 24 simultaneously take data. In step 32, analyzer 26 calculates the base phasor $H_0$ as an equation 5. Next, in step 34, weights having a known mass are positioned at known locations on each of the vehicle wheels 12. Then, in step 36, $H_1$ is calculated. Once this information is obtained, Equation 9 can be solved for X, wherein X represents the unknown excitation at the wheel expressed as an equivalent imbalance. With this information, as is known to one skilled in the art, weights can be applied from knowing X to offset the vehicle imbalance at each wheel.

Figure 5:
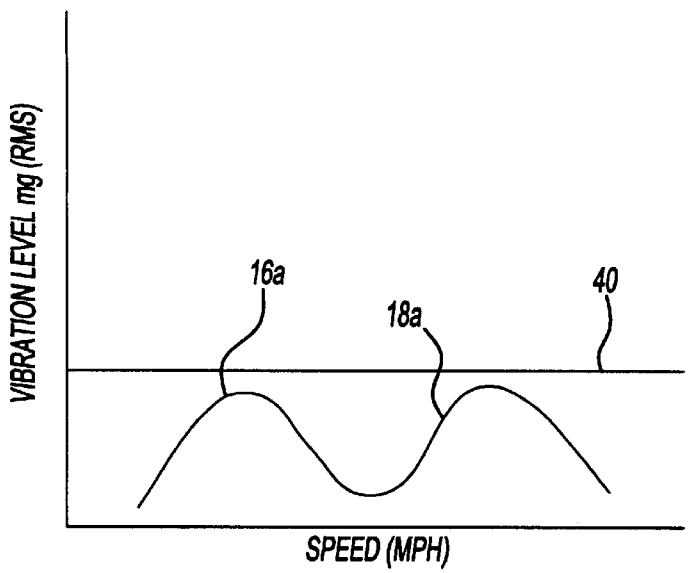
FIG. 5 is a graphical view of transmitted vibrations on parts within a vehicle using an on-road dynamic balancing system according to the present invention.

Referring to FIGS. 3 and 5, a second embodiment of the present invention is shown and described. In the second embodiment, component 18 is targeted simultaneously with and at a different frequency from component 16. The different targeted frequencies may be due to component 16 having a different natural frequency than component 18, thereby resulting in component 16 noticeably oscillating at a different vehicle speed from component 18. It is desirable to eliminate periodic vibrations in components 16 and 18 at both vehicle speeds. Accordingly, a different set of weights positioned at a different location on the vehicle wheels may be needed to eliminate vibrations in component 16 than will eliminate vibrations in component 18. However, it may in fact be impossible to reduce vibrations generated in both components 16 and 18 with a single solution of weights (amount and position on rim) at the respective wheels. As such, the second embodiment seeks to maintain both at a minimum amount. It is further recognized that components 16 and 18 need not be different components, but rather the same component evaluated at two different conditions of operation, such as two distinct speeds. It is also recognized that any number of minimization functions could be used to determine the exact amount and location of the added final balance weights at the wheel positions. As examples, these minimization functions could employ frequency-weighting filters to represent either vehicular transmissibilities or human responsiveness to vibration at various occupant interface sites and frequencies of interest.

Figure 6:
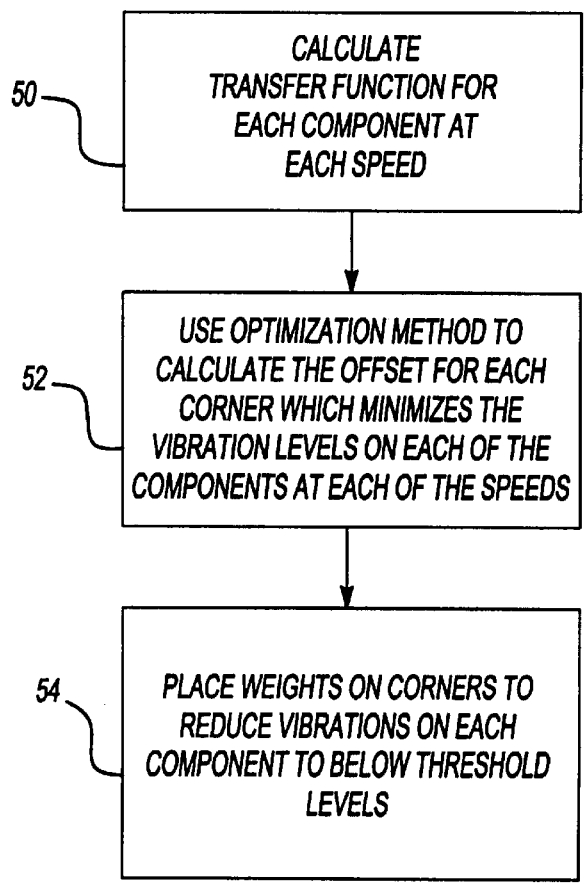
FIG. 6 is a flow chart depicting a process for using the on-road dynamic balancing system according to the present invention for multiple vibration measurement sites of the vehicle.

Accordingly, as shown in FIG. 5, a threshold level 40 is established at a certain vibration level for a certain component. This is the maximum acceptable vibration level for a vehicle driver or passenger. X is then calculated via Optimization Methods to minimize the first order vibrations 16A and 18A for multiple components 16 and 18 and multiple speeds. The process to minimize vibrations in multiple components 16 and 18 is shown in FIG. 6. In step 50, the Transfer Function is calculated for each component at each speed by the method set out in FIG. 4. In step 52, X is calculated via Optimization Methods. In step 54, weights are placed, according to X, on each corner to maintain vibrations 16A and 18A below the threshold level 40.

In another embodiment of the present invention, vibration sensors 20 and 22 are permanently affixed to components 16 and 18 respectively. Counters 24 are likewise permanently coupled to vehicle wheels 12. Analyzer 26 records the data from each sensor during the life of the vehicle and at various speeds. As such, when the vehicle wheels 12 are to be balanced, a service technician merely taps into analyzer 26 and downloads the stored information therefrom. The service technician can then place the appropriate weights on the vehicle wheels without having to operate the vehicle.

Figure 7:
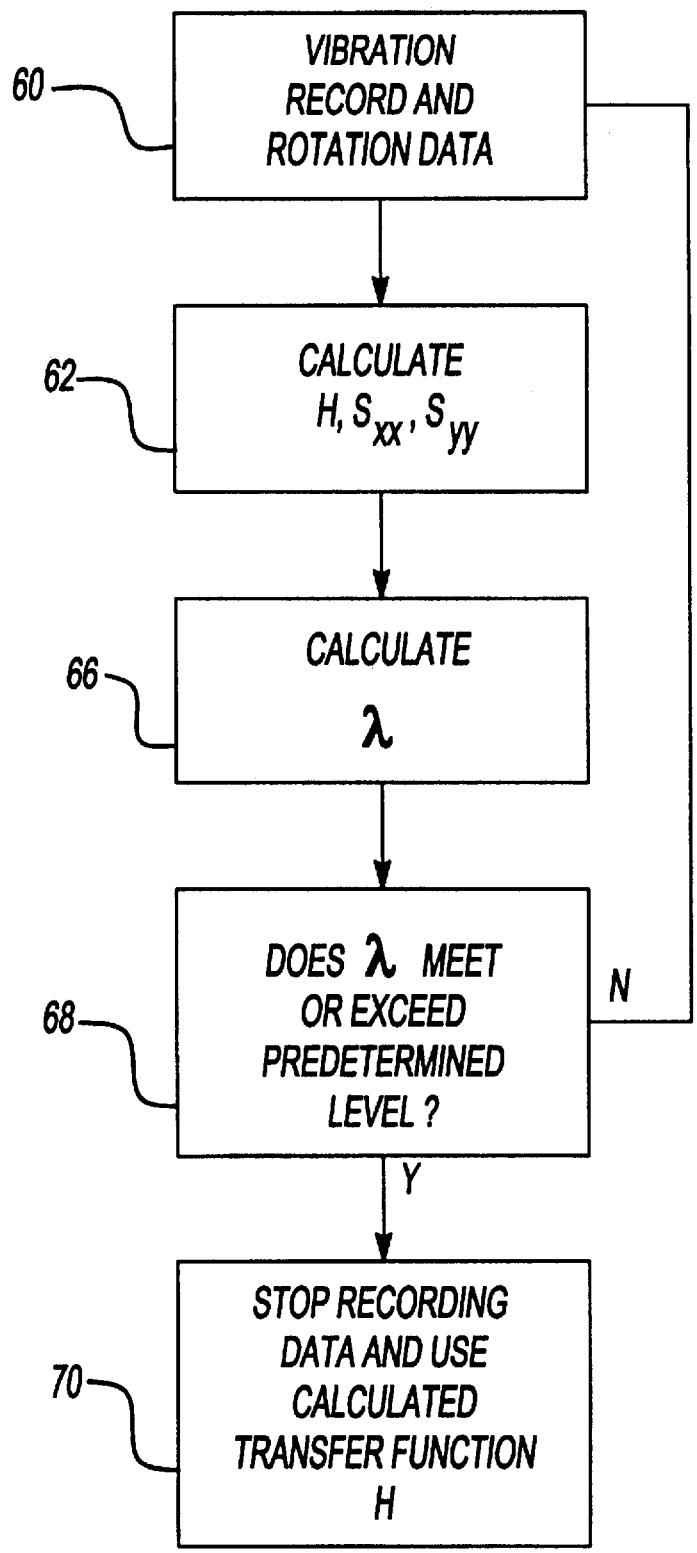
FIG. 7 is a block diagram illustrating data gathering for on-road balancing according to the present invention.

The present invention is able to simultaneously calculate the required phasor quantities for four wheels. It accomplishes this by the fact that each of the four wheels change rotational position with respect to the remaining three wheels. This commonly occurs when the vehicle makes lane changes, is operated for a relatively lengthy period of time (allowing the unequal wheels, rotating at their similar, yet uniquely different rotational rates, to freely rotate relative to each other), and turns through normal deviations from a straightline path. Accordingly, vibration and rotational data are recorded over a long period of time to allow the wheels to rotate with respect to each other. Theoretically, if the vehicle travels an infinite distance, the error margin approaches zero. Accordingly, in another embodiment of the present invention, as described in FIG. 8, data are recorded until such time that the off-diagonal coherence values of Eq 6 are eventually bouned by a desired value. Here, analyzer 16 simultaneously calculates $S_{XY}$, transfer function H and $S_{YY}$ to continuously calculate the coherence factor according to Eq. 6. This is an indication of the adequacy of the orthogonality of the excitation matrix x and enables decomposition of excitation sources using the linear superposition model. Once the desired value is achieved, the system uses the current phasor quantities, H. This is further illustrated in FIG. 7. In block 60, vibration and rotation data are gathered from any or all of the components being analyzed in block 32 and 36 of FIG. 4. The phasor quantities H, $S_{XX}$ $S_{YY}$ are also calculated. In block 66, the coherence factor $\gamma^2$ is calculated. In block 68, $\gamma^2$ is analyzed to determine if it meets or exceeds a predetermined level. As described previously, these levels are preferably at least 0.8, but desirably higher than 0.9. If $\gamma^2$ meets or exceeds the predetermined level, block 70 is executed and data recording is stopped. The previously calculated phasor quantities H are used as the phasor quantities. If $\gamma^2$ does not meet or exceed the predetermined level, then block 60 is executed and vibration and rotational data are gathered.

As would be apparent to those skilled in the art, the present invention is similarly able to simultaneously calculate the required phasor quantities for any number of wheels so long as all wheels are rotating at essentially the same frequency. In this context, essentially the same frequency implies within the frequency resolution determined by the data sampling parameters. The use of a four-second data sampling window implies a 0.25 Hz frequency resolution. Therefore, all rotating components within 0.25 Hz of one another could be considered to be rotating at essentially the same frequency. The present invention could, of course, be applied to wheels or other rotating parts rotating at different frequencies; but, each part-frequency combination must be treated separately.

What is claimed is:

1. A method for conducting on-road dynamic balancing, the method comprising the steps of:

recording base rotation data from at least one rotation sensor coupled to at least one wheel of a vehicle when the vehicle is traveling at about a predetermined speed;

recording base vibration data from a vibration sensor coupled to a component when the vehicle is traveling at about the predetermined speed;

calculating a base phasor quantity from the base rotation data and the base vibration data;

placing at least one weight at a location on the at least one wheel of the vehicle;

recording offset rotation data from the at least one rotation sensor and offset vibration data from the vibration sensor when the vehicle is traveling at about the predetermined speed; and calculating an offset phasor quantity from the offset vibration data and the offset rotation data.

2. The method according to claim 1, further comprising the step of calculating an offset from the base phasor quantity and the offset phasor quantity.

3. The method according to claim 1, wherein the base rotation data and the offset rotation data are recorded in a plurality of four-second blocks.

4. The method according to claim 1, wherein the base vibration data, base rotation data, the offset vibration data, and the offset rotation data are recorded until coherence levels of the off-diagonal terms of the excitation matrix reach a predetermined value.

5. The method according to claim 4, wherein the predetermined value is at or below 0.20.

6. The method according to claim 4, wherein the predetermined value is at or below 0.10.

7. The method according to claim 1, wherein the at least one rotation sensor includes four rotation sensors and the at least one wheel includes four wheels, each of the four rotation sensors being positioned on a respective one of the four wheels.

8. The method as claimed in claim 1, further comprising the steps of:
recording a second set of base vibration data from a second vibration sensor coupled to a second component at about a second vehicle speed;
recording a second set of base rotation data from the rotation sensor at about the second vehicle speed;
calculating a second base phasor quantity from the second base vibration data and the second base rotation data;
placing a second weight at a predetermined location on the at least one wheel;
recording second offset vibration data and second offset rotation data at the second vehicle speed; and
calculating a second offset phasor quantity based on the second offset vibration data and the second offset rotation data.

9. The method according to claim 8, further comprising the steps of:
determining a threshold vibration level; and
calculating a first offset from the base transfer function and the offset transfer function and a second offset from the second base transfer function and the second offset transfer function sufficient to maintain the vibration on the component and the second component below the threshold vibration level.

10. The method according to claim 1, wherein the predetermined speed causes first order vibrations in the component.

11. The method according to claim 10, wherein the base vibration data and the offset vibration data are recorded at a frequency of the first order vibration.

12. An apparatus for conducting off road balancing of wheels of a vehicle, the apparatus comprising:
an analyzer;
at least one vibration sensor coupled to a component on a vehicle; and
at least one rotation sensor coupled to at least one wheel of the vehicle;
wherein the computer is adapted to calculate a phasor quantity representative of vibrations generated by the wheel responsive to vibration data provided by the vibration sensor and rotation data provided by the rotation sensor.

13. The apparatus as claimed in claim 12, further comprising a second vibration sensor coupled to a second component within the vehicle, the analyzer adapted to calculate a second phasor quantity based on second vibration data provided by the second vibration sensor at the second speed.

14. The apparatus as claimed in claim 12, wherein the at least one rotation sensor includes four rotation sensors and the at least one wheel includes four wheels, each of the four rotation sensors coupled with a respective one of the four wheels, the computer adapted to calculate transfer functions representative of vibrations generated from each of the four wheels.

15. The apparatus as claimed in claim 12, wherein the computer is adapted to calculate an offset from two separate calculated sets of phasor quantities.

16. The apparatus as claimed in claim 12, wherein the vibration sensor is formed integral with the component.

17. A vehicle comprising:
an apparatus for performing on-road balancing of a wheel vehicle, the apparatus comprising:
at least one rotation sensor coupled to the at least one wheel;
a vibration sensor coupled to a component in the vehicle;
an analyzer responsive to the at least one rotation sensor and the vibration sensor, the analyzer adapted to calculate a phasor quantity based on data provided by the rotation sensor and the vibration sensor.

18. The vehicle as claimed in claim 17, wherein the at least one rotation sensor includes four rotation sensors and the at least one wheel includes four wheels, each of the four rotation sensors coupled to a respective one of the four wheels, the analyzer adapted to calculate a phasor quantity for each respective one of the wheels.

19. The vehicle as claimed in claim 18, further comprising a second vibration sensor coupled to a second component within the vehicle, the analyzer adapted to calculate a second phasor quantity based on input data from the second vibration sensor.

* * * * *

UNITED STATES PATENT AND TRADEMARK OFFICE
CERTIFICATE OF CORRECTION

PATENT NO. : 6,714,858 B2 Page 1 of 1
DATED : March 30, 2004
INVENTOR(S) : Kenneth L. Oblizajek, Carl T. Wright, John D. Sopoci It is certified that error appears in the above-identified patent and that said Letters Patent is hereby corrected as shown below:

<u>Column 4,</u>
Line 11, replace "16A and 16B" with -- 16 and 18 --.

<u>Column 5,</u>
Line 30, replace "transformed" with -- transformed --.

<u>Column 8,</u>
Eq. 8 reading "$^2$" should read -- $\gamma^2$ --;
Line 24, replace "X" to -- $\Delta X$ --.

Signed and Sealed this

First Day of June, 2004

JON W. DUDAS
*Acting Director of the United States Patent and Trademark Office*